(12) United States Patent
Stanley et al.

(10) Patent No.: US 11,843,629 B2
(45) Date of Patent: Dec. 12, 2023

(54) CHANNEL TO REPORT PUSH NOTIFICATIONS AS SPAM

(71) Applicant: International Business Machines Corporation, Armonk, NY (US)

(72) Inventors: Norton Samuel Augustus Stanley, Bangalore (IN); Josephine E. Justin, Bangalore (IN); Badekila Ganesh Prashanth Bhat, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 17/651,794

(22) Filed: Feb. 19, 2022

(65) Prior Publication Data

US 2023/0269268 A1    Aug. 24, 2023

(51) Int. Cl.
| | |
|---|---|
| *G06F 15/16* | (2006.01) |
| *H04L 9/40* | (2022.01) |
| *H04L 67/55* | (2022.01) |
| *H04W 68/00* | (2009.01) |

(52) U.S. Cl.
CPC .......... *H04L 63/1441* (2013.01); *H04L 67/55* (2022.05); *H04W 68/005* (2013.01)

(58) Field of Classification Search
CPC ... H04L 63/1441; H04L 67/55; H04W 68/005
See application file for complete search history.

(56) References Cited

U.S. PATENT DOCUMENTS

| | | | |
|---|---|---|---|
| 8,994,671 B2* | 3/2015 | Reeves | G06F 3/04845 345/1.3 |
| 9,571,497 B1 | 2/2017 | Venkataramani | |
| 10,135,941 B2 | 11/2018 | Deluca | |
| 10,291,563 B1* | 5/2019 | Wheeler | H04L 63/1475 |
| 2011/0145922 A1* | 6/2011 | Wood | H04L 51/48 709/206 |
| 2011/0246583 A1* | 10/2011 | Vitaldevara | G06Q 10/107 709/206 |
| 2018/0020002 A1* | 1/2018 | Duca | G06F 21/572 |
| 2019/0140883 A1 | 5/2019 | Greenberger | |
| 2023/0086556 A1* | 3/2023 | Himler | H04L 63/1441 |

FOREIGN PATENT DOCUMENTS

IN    202041032039 A    8/2020

OTHER PUBLICATIONS

"Collaborative Spam Classification with Selective and Controlled Inband Notification", An IP.com Prior Art Database Technical Disclosure, Original Publication Date: Sep. 2, 2005, IP.com No. IPCOM000127583D, Electronic Publication Date: Sep. 2, 2005, 5 pages.

(Continued)

*Primary Examiner* — Wing F Chan
*Assistant Examiner* — Andrew Woo
(74) *Attorney, Agent, or Firm* — Edward J. Wixted, III (57) ABSTRACT

In an approach, a processor receives a report of a push notification identified as spam. A processor determines that a threshold number of push notifications identified as spam has been exceeded. A processor, responsive to determining that the threshold number of push notifications identified as spam has been exceeded, performs an action with respect to a sender of the push notification.

20 Claims, 4 Drawing Sheets

(56) References Cited

OTHER PUBLICATIONS

"Local and Remote Binary Provider Notification Programming Guide: Binary Provider API", Apple Developer, Printed Nov. 29, 2021, 5 pages, <https://developer.apple.com/library/archive/documentation/NetworkingInternet/Conceptual/RemoteNotificationsPG/BinaryProviderAPI.html#//apple_ref/doc/uid/TP40008194-CH13-SW12>.

"System and methods for smart notification", An IP.com Prior Art Database Technical Disclosure, Disclosed Anonymously, IP.com No. IPCOM000249088D, IP.com Electronic Publication Date: Feb. 3, 2017, 6 pages.

Davenport, Corbin, "How to block spam notifications and rogue ads on Android", Android Police, Sep. 14, 2019, 9 pages, <https://www.androidpolice.com/2019/09/14/track-block-rogue-ads-android/>.

\* cited by examiner

CHANNEL TO REPORT PUSH NOTIFICATIONS AS SPAM

BACKGROUND

The present invention relates to push notifications, and more specifically, to an approach to enable a user to report push notifications as spam and, in response, provide warnings to application owners and/or disable future push notifications.

A push notification is a message that is "pushed" from a backend server or application to a user interface. In general, a push notification is an automated message sent by an application to a user when the application is not open. Push notifications are widely used by application administrative users to engage with application users and notify application users of news, offers, updates, or other information that might be useful to the application user.

SUMMARY

According to an embodiment of the present invention, a computer-implemented method, computer program product, and computer system are provided. A processor receives a report of a push notification identified as spam. A processor determines that a threshold number of push notifications identified as spam has been exceeded. A processor, responsive to determining that the threshold number of push notifications identified as spam has been exceeded, performs an action with respect to a sender of the push notification.

DETAILED DESCRIPTION

Embodiments of the present invention recognize that application administrative users (e.g., application owners) sometimes take advantage of push notification features and send application users a variety of push notifications that may be of no interest to the application users and, in some instances, could be considered spam. Spamming is the use of messaging systems, such as push notification systems, to send unsolicited messages to recipients for the purpose of, for example, advertising. Embodiments of the present invention recognize that application users often receive push notifications that they are uninterested in and, while the application user may have options to silence some or all of these notifications, the application user does not have an option to report such an unsolicited push notification as spam. Embodiments of the present invention describe an approach for a user to report a received push notification as spam and report the application to an associated notification platform provider (e.g., Apple® Push Notification service (APNs), Firebase™ Cloud Messaging (FCM). Embodiments of the present invention further describe an approach to provide application administrative users with details of the reported spam, the category of the spam, and other information in order to cause the application administrative user to reduce generating similar push notifications in the future. In some embodiments of the present invention, a notification platform provider may generate warnings or disable notifications for a category of notifications based on received spam reports. Embodiments of the present invention recognize that by reducing the number of spam notifications that are generated and sent to application users, the platform provider enhances the usage and convenience of the platform for application users. Further, because reducing the number of spam notifications results in a decrease in overall notifications that need to be processed, such an approach decreases the total amount of processing power required to process notifications and increases the efficiency of the system.

The present invention will now be described in detail with reference to the Figures.

Figure 1:
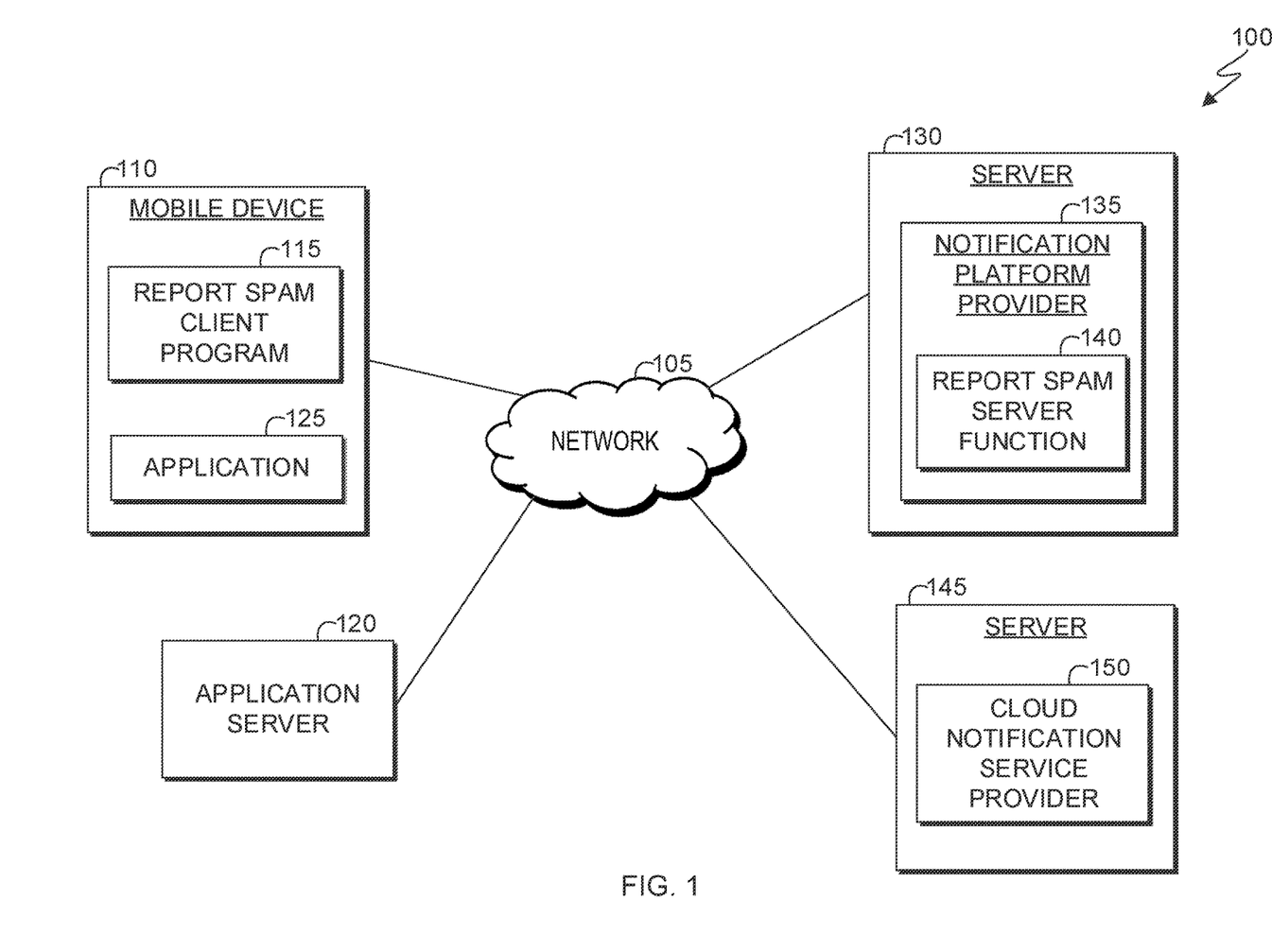
FIG. 1 is a functional block diagram illustrating a computer environment, in accordance with an embodiment of the present invention.

FIG. 1 is a functional block diagram illustrating a computing environment, generally designated 100, in accordance with one embodiment of the present invention. FIG. 1 provides only an illustration of one embodiment and does not imply any limitations with regards to the environments in which different embodiments may be implemented.

In the depicted embodiment, computing environment 100 includes mobile device 110, application server 120, server 130, and server 145 interconnected over network 105. Network 105 may be a local area network (LAN), a wire area network (WAN), such as the Internet, the public switched telephone network (PSTN), any combination thereof, or any combination of connections and protocols that will support communications between mobile device 110, application server 120, server 130, and server 145, in accordance with embodiments of the present invention. Network 105 may include wired, wireless, or fiber optic connections. Computing environment 100 may include additional servers, computing devices, or other devices not shown.

Application server 120 may be a management server, a web server, or any other electronic device or computing system capable of sending and receiving data and communicating with mobile device 110, server 145, and/or server 130 via, for example, network 105. In some embodiments, application server 120 may represent a server computing system utilizing multiple computers as a server system, such as in a cloud computing environment. Application server 120 may be an enterprise server capable of hosting or otherwise managing access to and data provided to an application (e.g., mobile application), such as application 125. Application server 120 may generate push notifications for application 125 that are to be sent to mobile device 110 for display on a user interface. Application server 120 may include components, as depicted and described in further detail with respect to FIG. 4.

Mobile device 110 may be a desktop computer, laptop computer, netbook computer, tablet computer, personal digital assistant (PDA), or smartphone. In general, mobile device 110 may be any electronic device or computing system capable of receiving push notifications for application 125 and presenting the push notifications on a user interface of mobile device 110. Mobile device 110 may receive such push notifications via communicating with server 130 via, for example, network 105. Mobile device 110 contains report spam client program 115 and application 125. Mobile device 110 may include an operating system (OS) that includes one or more application programming interfaces (APIs) that can be exposed by report spam client program 115 to modify notifications to include an option to report spam. Mobile device 110 may include components, as depicted and described in further detail with respect to FIG. 4.

Application 125 is an application, such as a mobile application, that is located on mobile device 110. Application 125 may be managed by application server 120 and receive push notifications generated by application server 120 and/or an administrative user that manages application 125. Application 125 may be any type of application that causes push notifications to be sent to mobile device 110.

Report spam client program 115 operates to add a report spam option to push notifications that are presented on mobile device 110 and, if such a report spam option is selected, generate and send a report of the push notification to notification platform provider 135 and/or report spam server function 140. In some embodiments, report spam client program 115 utilizes an API of the OS of mobile device 110 to modify notifications in order to include a report spam option. In other embodiments, report spam client program is a function of the OS of mobile device 110. In one embodiment, report spam client program 115 resides on mobile device 110. In other embodiments, report spam client program 115 may reside on another computing device, provided that report spam client program 115 can communicate with mobile device 110 and has access to the OS APIs that enable modification of push notifications to add a report spam option.

Server 145 may be a management server, a web server, or any other electronic device or computing system capable of sending and receiving data and communicating with application server 120 and server 130 via, for example, network 105. In some embodiments, server 145 may represent a server computing system utilizing multiple computers as a server system, such as in a cloud computing environment. Server 145 may be an enterprise server for a cloud notification service provider, such as cloud notification service provider 150. Server 145 contains cloud notification service provider 150. Server 145 may include components, as depicted and described in further detail with respect to FIG. 4.

Cloud notification service provider 150 is a cloud notification service provider (e.g., Amazon® Pinpoint) that interacts with one or more notification platform providers to enable applications, such as application 125, to send push notifications to users of different notification platforms. Cloud notification service provider 150 may support a variety of notification platform providers such as, but not limited to, notification platform provider 135. Cloud notification service provider 150 operates to receive push notifications from an application server, such as application server 120 and process the push notification such that the push notification is relayed to notification platform provider 135 for distribution to particular devices, such as mobile device 110. In some embodiments, cloud notification service provider may send errors or warnings to application administrative users at application server 120 as a result of a warning or notification ban generated by report spam server function 140. It should be noted that, in some embodiments, the functionality described with respect to cloud notification service provider 150 may be performed by notification platform provider 135 if, for example, application server 120 is communicating directly with notification platform provider 135 and is not utilizing a cloud notification service provider, such as cloud notification service provider 150. In one embodiment, cloud notification service provider 150 resides on server 145. In other embodiments, cloud notification service provider 150 may reside on another server, or another computing device, provided that cloud notification service provider 150 can communicate with application server 120, server 130, notification platform provider 135, and/or report spam server function 140.

Server 130 may be a management server, a web server, or any other electronic device or computing system capable of sending and receiving data and communicating with server 145 and mobile device 110 via, for example, network 105. In embodiments that do not include cloud notification service provider 150, server 130 may communicate directly with application server 120 via, for example, network 105. In some embodiments, server 130 may represent a server computing system utilizing multiple computers as a server system, such as in a cloud computing environment. Server 130 may be an enterprise server for a notification platform provider, such as notification platform provider 135. Server 130 contains notification platform provider 135 and report spam server function 140. Server 130 may include components, as depicted and described in further detail with respect to FIG. 4.

Notification platform provider 135 is a notification platform provider (e.g., APNs, FCM) that enables third party application developers to send push notification data to mobile devices, such as mobile device 110. In some embodiments, report spam server function 140 is a function of notification platform provider 135. Notification platform provider 135 generally operates to process push notifications received from application server 120 and/or cloud notification service provider 150 and to deliver the received push notification to the application 125 user(s) at, for example, mobile device 110. In one embodiment, notification platform provider 135 resides on server 130. In other embodiments, notification platform provider 135 may reside on another server, or another computing device, provided that notification platform provider 135 can communicate with application server 120, mobile device 110, cloud notification service provider 150, and/or report spam client program 115.

Report spam server function 140 operates to generate warnings to application administrative users and/or disable notifications for particular applications, or categories of push notifications generated by particular applications, based on receiving indications of push notifications that have been identified as spam by users of an application, such as application 125 at computing devices, such as mobile device 110. In some embodiments, In some embodiments, report spam server function 140 is a function of notification platform provider 135. In other embodiments, report spam server function 140 may be an external application implemented as a microservice or module that operates to provide the above described functionality to a notification platform provider, such as notification platform provider 135. In one embodiment, report spam server function 140 resides on a server containing notification platform provider 135, such as server 130. In other embodiments, report spam server function 140 may reside on another server, or another computing device, provided that report spam server function 140 can communicate with report spam client program 115, notification platform provider 135, cloud notification service provider 150, and/or application server 120.

Figure 2:
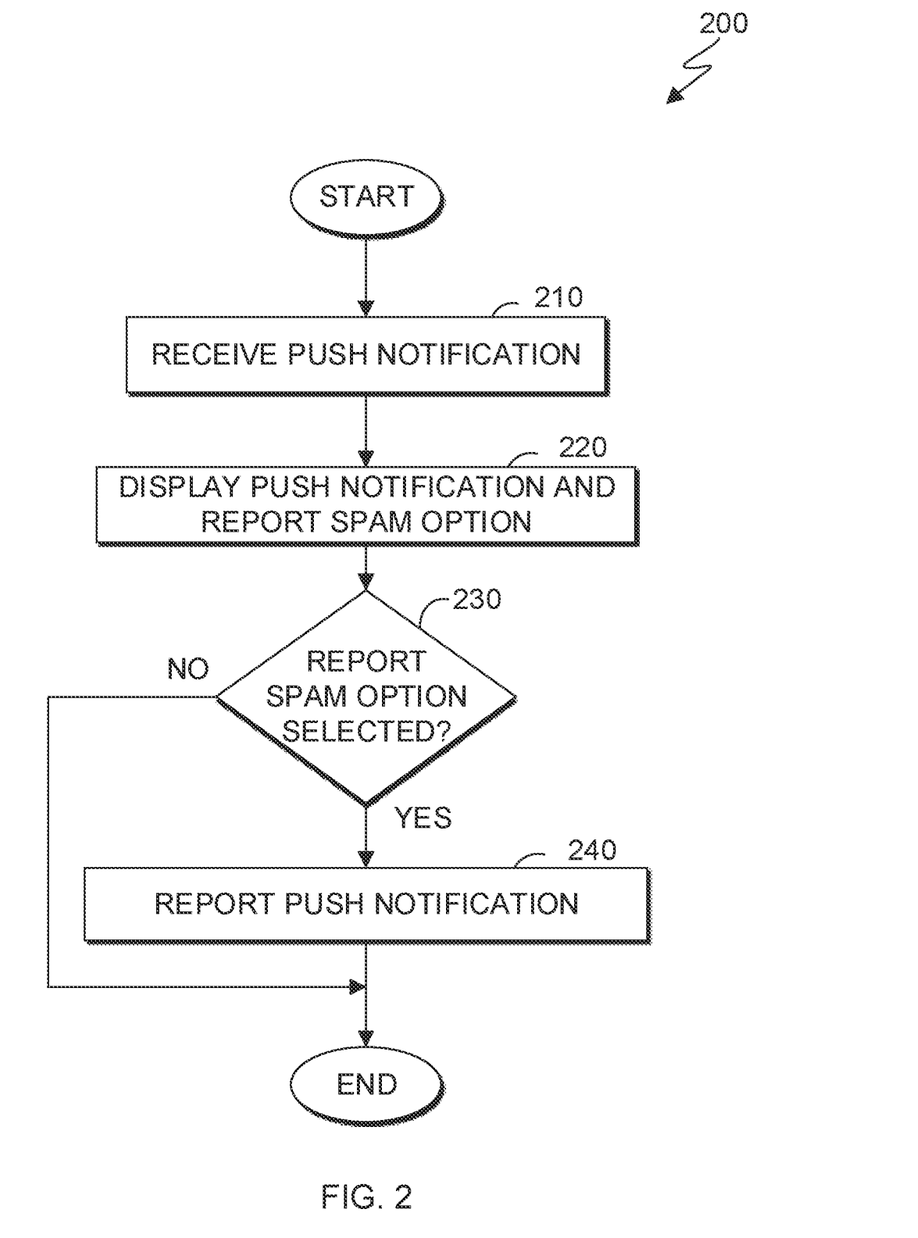
FIG. 2 is a flowchart depicting operational steps of a report spam client program executing within the computer environment of FIG. 1, for adding a report spam option to push notifications and, if such a report spam option is selected, generate and send a report of the push notification to a notification platform provider and/or a report spam server function, in accordance with an embodiment of the present invention.

FIG. 2 depicts a flowchart 200 for the steps of report spam client program 115, executing within the computing environment 100 of FIG. 1, for displaying push notifications with a report spam option and, if the report spam option is selected, reporting the associated push notification as spam.

In one embodiment, initially, a user of mobile device 110 downloads and application, such as application 125, to mobile device 110. An administrative user of application server 120 may cause a push notification associated with application 125 to be sent to mobile device 110 via, for example, cloud notification service provider 150 and/or notification platform provider 135.

In step 210, spam client program 115 receives a push notification. Spam client program 115 may receive a push notification from notification platform provider 135 via network 105.

In step 220, spam client program 115 displays the push notification along with a report spam option. In some embodiments, the report spam option may be present when the notification is swiped sideways across a screen of mobile device 110. In other embodiments, the report spam option may be present on the push notification as it is displayed on the screen of mobile device 110. Spam client program 115 may utilize one or more APIs to modify the display of push notifications to include an option to report spam.

In decision 230, report spam client program 115 determines whether the report spam option has been selected by a user of mobile device 110. Report spam client program 115 determines that the report spam option has been selected upon receiving a selection of the report spam option. If report spam client program 115 does not receive a selection of the report spam option (decision 230, no branch), the program is complete until such a selection is made. If report spam client program 115 receives a selection of the report spam option (decision 230, yes branch), report spam client program 115 reports the push notification as spam (see step 240).

In step 240, report spam client program 115 reports the push notification as spam to notification platform provider 135 and/or report spam server function 140. Report spam client program 115 may send the push notification, or information about the push notification (e.g., time received, content of the message) to notification platform provider 135 and/or report spam server function 140.

Figure 3:
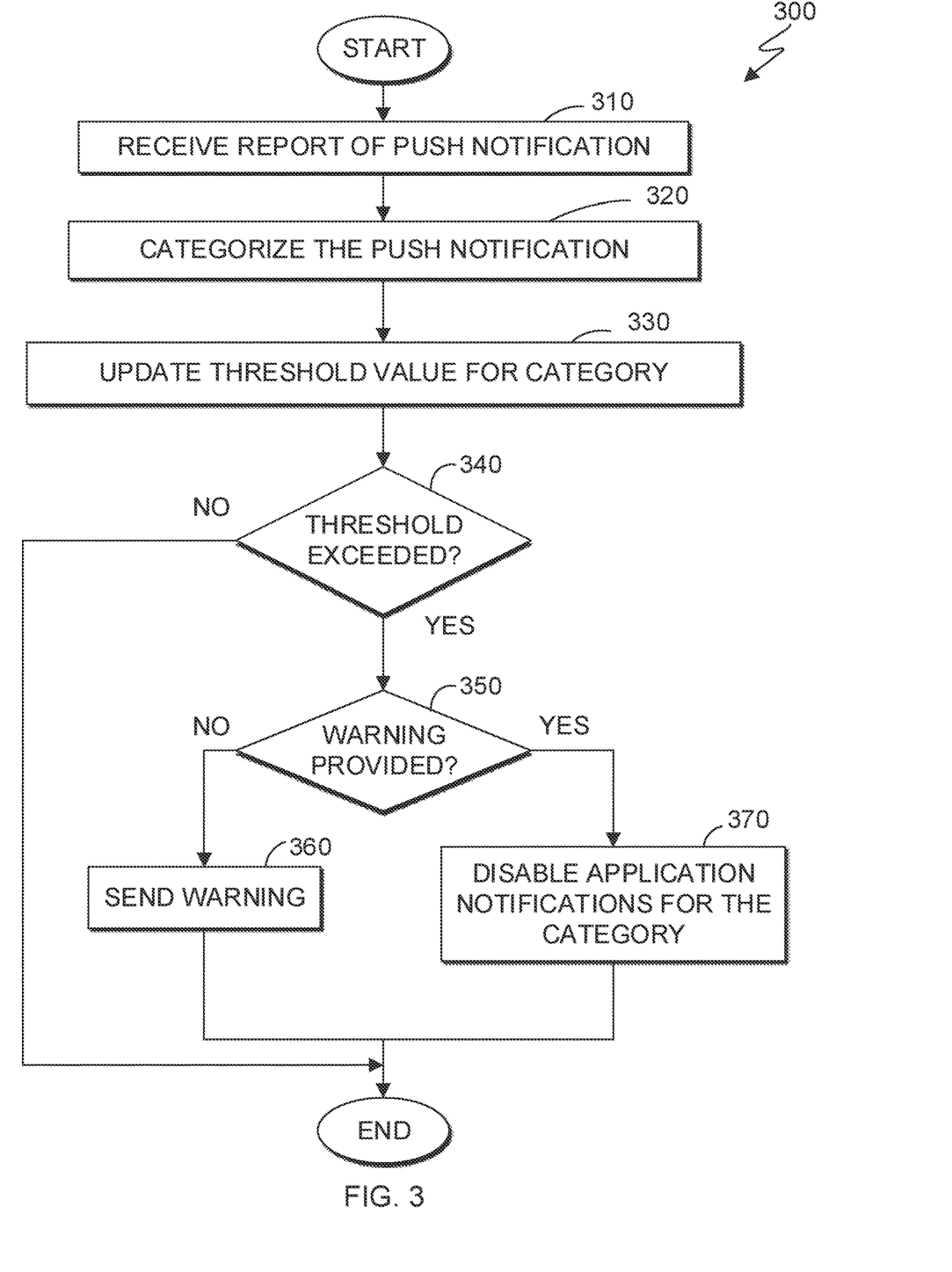
FIG. 3 is a flowchart depicting operational steps of a report spam server function executing within the computer environment of FIG. 1, for generating warnings to application administrative users and/or disabling push notifications for particular applications or categories of push notifications based on receiving indications of push notifications that have been identified as spam, in accordance with an embodiment of the present invention.

FIG. 3 depict a flowchart 300 for the steps of report spam server function 140, a function of notification platform provider 135, for generating warnings to application administrative users and/or disabling notifications based on receiving indications of push notifications that have been identified as spam by users of an application, such as application 125 at computing devices, such as mobile device 110.

In one embodiment, initially, a user at mobile device 110 selects a report spam option for a received push notification.

In step 310, report spam server function 140 receives a report of a push notification identified by a user of mobile device 110 as spam. As described, the report my include information about the push notification (e.g., time received, content of the message) or a copy of the push notification.

In step 320, report spam server function 140 categorizes the push notification. Push notifications may include a variety of categories such as, but not limited to, product recommendations, sales, offers, advertisements, reminders (e.g., a push notification that informs a user that the user has not accessed a particular application within a period of time), news notifications, sports score notifications, and a variety of other types of categories. Report spam server function 140 may analyze the content of the push notification and determine that the push notification belongs within a particular category. In some embodiments, report spam server function 140 utilizes natural language processing (NLP) and/or machine learning algorithms trained on, for example, already categorized push notifications, to determine a category for the push notification.

In step 330, report spam server function 140 updates a threshold value for the category to which report spam server function 140 categorized the push notification. In some embodiments, the threshold value is associated with a particular cloud notification service provider, such as cloud notification service provider 150. The threshold value may be tied to a particular cloud notification service provider because each cloud notification service provider may be associated with a different application server, such as application server 120, or plurality of applications and application servers. Accordingly, report spam server function 140 may treat each cloud notification service provider as a separate silo with separate and distinct threshold values. In general, the threshold is a predetermined minimum number of instances in which a user has reported a push notification as spam in a particular category. In some embodiments, the threshold corresponds to a particular time period (e.g., a number of instances within the past two months). In some embodiments, the threshold corresponds to a particular percentage of push notifications sent (e.g., greater than 10% of the push notifications sent had a user report as spam). A variety of different thresholds may be used in embodiments of the present invention. In general, the threshold value corresponds to a threshold above which notification platform provider 135 or report spam server function 140 should take action to attempt to reduce spam push notifications that are sent by cloud notification service provider 150 and/or application server 120.

In decision 340, report spam server function 140 determines whether the threshold has been exceeded. As described above, report spam server function 140 updates and maintains a threshold value for one or more categories for cloud notification service providers such as cloud notification service provider 150. Report spam server function 140 determines whether the threshold has been exceeded by accessing the threshold value and comparing the threshold value to the threshold. If the threshold has not been exceeded (decision 340, no branch), the function is complete. If the threshold has been exceeded (decision 340, yes branch), report spam server function 140 determines whether a warning has already been provided to the corresponding cloud notification service provider (e.g., cloud notification service provider 150) or application server (e.g., application server 120) (see decision 350).

In decision 350, report spam server function 140 determines whether a warning has been provided. In general, report spam server function 140 determines whether a warning has been provided to the cloud notification service provider (e.g., cloud notification service provider 150) that provided the push notification corresponding to the spam report. In some embodiments, report spam server function 140 operates to initially provide a warning and, if the warning is determined to be insufficient, disable notifications from the cloud notification service provider or a particular application, such as application 125 and push notifications originating from application server 120. In some embodiments, the threshold described with respect to step 330 and decision 340 may be reset upon determining that the threshold has been exceeded. In other embodiments, the threshold may have multiple tiers, with a first tier minimum value corresponding to a need to send a warning and a second, higher tier corresponding to a need to disable notifications. In some embodiments, report spam server function 140 determines whether a warning has been provided within, for example, a particular time period. If report spam server function 140 determines that a warning has not been provided (decision 350, no branch), report spam server function 140 sends a warning (see step 360). If report spam server function 140 determines that a warning has previously been provided (decision 350, yes branch), report spam server function 140 disables notifications for application 125 corresponding to the category associated with the reported push notification (see step 370).

In step 360, report spam server function 140 sends a warning. Report spam server function 140 may send a warning to the cloud notification service provider (e.g., cloud notification service provider 150) that provided the push notification reported as spam. In some embodiments, cloud notification service provider 150 is instructed to forward the warning to an application server, such as application server 120. In some embodiments, the warning may include a copy of each push notification, or information about each push notification, that corresponds to the category and application (e.g., application 125) of the push notifications reported as spam. In some embodiments, report spam server function 140 sends the warning directly to application server 120.

In step 370, report spam server function 140 disables notifications for the category of push notification corresponding to the push notification reported as spam. In some embodiments, report spam server function 140 only disables notifications for a particular application (e.g., application 125) that are received from a particular application server (e.g., application server 120). In other embodiments, report spam server function 140 may disable notifications for the identified category for all applications utilizing cloud notification service provider 150. In general, report spam server function 140 will prevent push notifications from being passed to user devices, such as mobile device 110, that originate from application server 120 and/or cloud notification service provider 150.

Subsequent to disabling push notifications from application server 120 and/or cloud notification service provider 150, report spam server function 140 may also provide a notification as to how notifications may be resumed. Such instructions may require administrative users of cloud notification service provider 150 or application server 120 to contact an administrative user of report spam server function to manually enable push notification services or there may be an automated process by which application server 120 may certify that changes have been made to future push notification processes in order to address the concerns provided by users who reported certain push notifications as spam.

Figure 4:
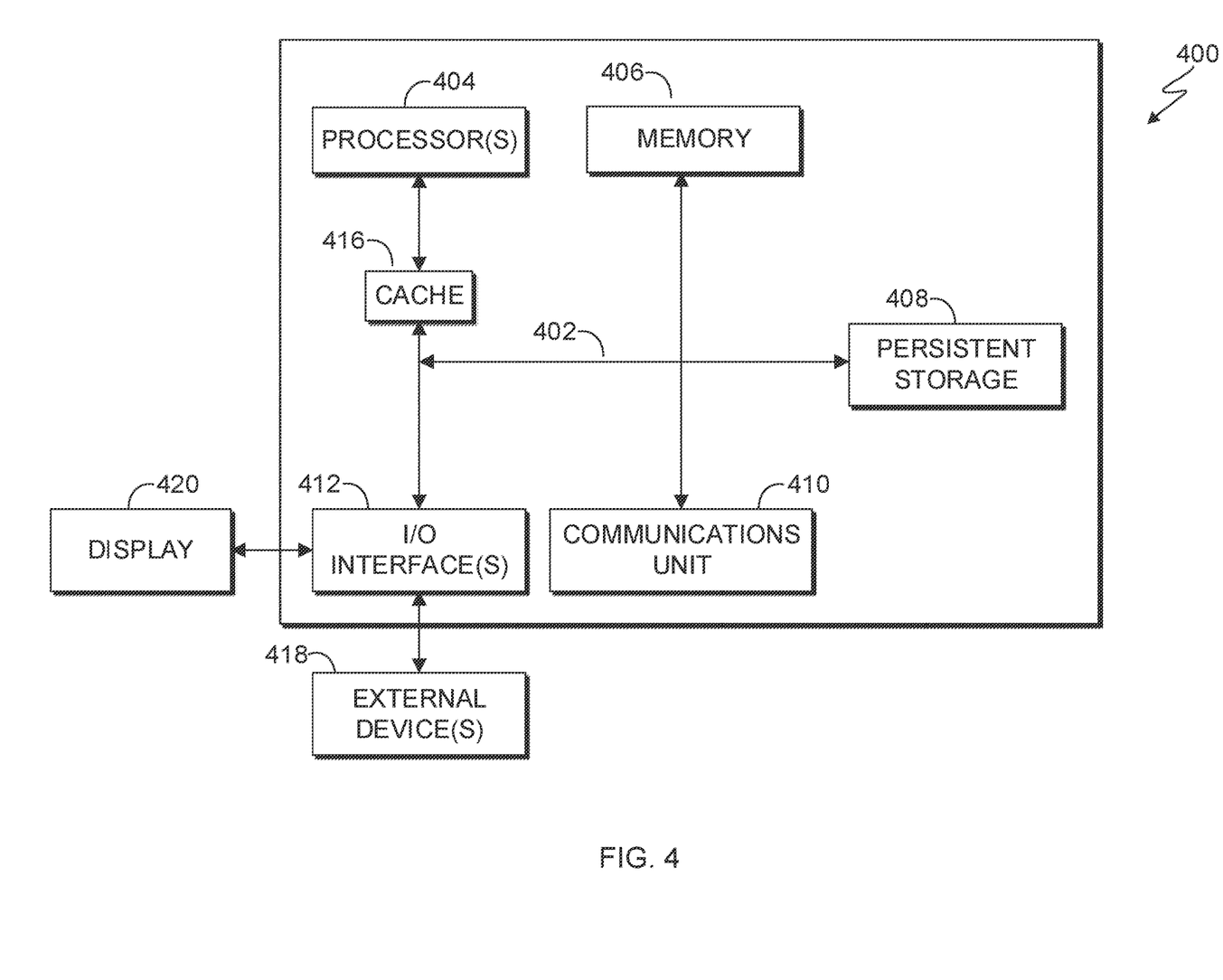
FIG. 4 is a block diagram of components of the mobile, application server, and/or servers illustrated within the computer environment of FIG. 1, in accordance with an embodiment of the present invention.

FIG. 4 depicts a block diagram of components of mobile device 110, application server 120, server 130, and/or server 145, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Mobile device 110, application server 120, server 130, and server 145 each include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Report spam client program 115 and application 125 may be stored in persistent storage 408 of mobile device 110 and in memory 406 of mobile device 110 for execution by one or more of the respective computer processors 404 of mobile device 110 via cache 416 of mobile device 110. Notification platform provider 135 and report spam server function 140 may be stored in persistent storage 408 of server 130 and in memory 406 of server 130 for execution by one or more of the respective computer processors 404 of server 130 via cache 416 of server 130. Cloud notification service provider 150 may be stored in persistent storage 408 of server 145 and in memory 406 of server 145 for execution by one or more of the respective computer processors 404 of server 145 via cache 416 of server 145. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Report spam client program 115 and application 125 may be downloaded to persistent storage 408 of mobile device 110 through communications unit 410 of mobile device 110. Notification platform provider 135 and report spam server function 140 may be downloaded to persistent storage 408 of server 130 through communications unit 410 of server 130. Cloud notification service provider 150 may be downloaded to persistent storage 408 of server 145 through communications unit 410 of server 145.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., report spam client program 115 and application 125, can be stored on such portable computer readable storage media and can be loaded onto persistent storage 408 of mobile device 110 via I/O interface(s) 412 of mobile device 110. Software and data used to practice embodiments of the present invention, e.g., notification platform provider 135 and report spam server function 140, can be stored on such portable computer readable storage media and can be loaded onto persistent storage 408 of server 130 via I/O interface(s) 412 of server 130. Software and data used to practice embodiments of the present invention, e.g., cloud notifications service provider 150, can be stored on such portable computer readable storage media and can be loaded onto persistent storage 408 of server 145 via I/O interface(s) 412 of server 145. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving a report of a push notification identified as spam, wherein the push notification is an automated message sent by an application to a user device when the application is unopen;
determining that a threshold number of push notifications identified as spam has been exceeded; and
responsive to determining that the threshold number of push notifications identified as spam has been exceeded, performing an action with respect to a sender of the push notification.

2. The computer-implemented method of claim 1, wherein performing the action comprises sending a warning to the sender of the push notification.

3. The computer-implemented method of claim 2, further comprising:
receiving a second report of a second push notification identified as spam;
determining that the warning has previously been sent; and
responsive to determining that the warning has previously been sent, disabling push notifications provided by the sender.

4. The computer-implemented method of claim 1, further comprising:
associating the push notification with a category of push notifications; and
wherein determining that the threshold number of push notifications identified as spam has been exceeded comprises determining that a threshold number of push notifications associated with the category and identified as spam has been exceeded.

5. The computer-implemented method of claim 1, wherein the report of the push notification identified as spam is received in response to a user selecting a report spam option on the push notification.

6. The computer-implemented method of claim 1, further comprising, prior to receiving the report of the push notification identified as spam, sending the push notification to the user device.

7. The computer-implemented method of claim 1, wherein the sender is selected from the group consisting of: a cloud notification service provider and an application owner.

8. A computer program product comprising:
one or more computer readable storage media, and program instructions collectively stored on the one or more computer readable storage media, the program instructions comprising:
program instructions to receive a report of a push notification identified as spam, wherein the push notification is an automated message sent by an application to a user device when the application is unopen;
program instructions to determine that a threshold number of push notifications identified as spam has been exceeded; and
program instructions to, responsive to determining that the threshold number of push notifications identified as spam has been exceeded, perform an action with respect to a sender of the push notification.

9. The computer program product of claim 8, wherein the program instructions to perform the action comprise program instructions to send a warning to the sender of the push notification.

10. The computer program product of claim 9, further comprising:
program instructions, collectively stored on the one or more computer readable storage media, to receive a second report of a second push notification identified as spam;
program instructions, collectively stored on the one or more computer readable storage media, to determine that the warning has previously been sent; and
program instructions, collectively stored on the one or more computer readable storage media, to, responsive to determining that the warning has previously been sent, disable push notifications provided by the sender.

11. The computer program product of claim 8, further comprising:
program instructions, collectively stored on the one or more computer readable storage media, to associate the push notification with a category of push notifications; and
wherein the program instructions to determine that the threshold number of push notifications identified as spam has been exceeded comprise program instructions to determine that a threshold number of push notifications associated with the category and identified as spam has been exceeded.

12. The computer program product of claim 8, wherein the report of the push notification identified as spam is received in response to a user selecting a report spam option on the push notification.

13. The computer program product of claim 8, further comprising, program instructions, collectively stored on the one or more computer readable storage media, to, prior to receiving the report of the push notification identified as spam, send the push notification to the user device.

14. The computer program product of claim 8, wherein the sender is selected from the group consisting of: a cloud notification service provider and an application owner.

15. A computer system comprising:
one or more computer processors, one or more computer readable storage media, and program instructions collectively stored on the one or more computer readable storage media for execution by at least one of the one or more computer processors, the program instructions comprising:
program instructions to receive a report of a push notification identified as spam, wherein the push notification is an automated message sent by an application to a user device when the application is unopen;
program instructions to determine that a threshold number of push notifications identified as spam has been exceeded; and
program instructions to, responsive to determining that the threshold number of push notifications identified as spam has been exceeded, perform an action with respect to a sender of the push notification.

16. The computer system of claim 15, wherein the program instructions to perform the action comprise program instructions to send a warning to the sender of the push notification.

17. The computer system of claim 16, further comprising:
program instructions, collectively stored on the one or more computer readable storage media for execution by at least one of the one or more computer processors, to receive a second report of a second push notification identified as spam;
program instructions, collectively stored on the one or more computer readable storage media for execution by at least one of the one or more computer processors, to determine that the warning has previously been sent; and
program instructions, collectively stored on the one or more computer readable storage media for execution by at least one of the one or more computer processors, to, responsive to determining that the warning has previously been sent, disable push notifications provided by the sender.

18. The computer system of claim 15, further comprising:
program instructions, collectively stored on the one or more computer readable storage media for execution by at least one of the one or more computer processors, to associate the push notification with a category of push notifications; and
wherein the program instructions to determine that the threshold number of push notifications identified as spam has been exceeded comprise program instructions to determine that a threshold number of push notifications associated with the category and identified as spam has been exceeded.

19. The computer system of claim 15, wherein the report of the push notification identified as spam is received in response to a user selecting a report spam option on the push notification.

20. The computer system of claim 15, further comprising, program instructions, collectively stored on the one or more computer readable storage media for execution by at least one of the one or more computer processors, to, prior to receiving the report of the push notification identified as spam, send the push notification to the user device.

* * * * *